United States Patent
Stovell

(10) Patent No.: US 8,776,760 B2
(45) Date of Patent: Jul. 15, 2014

(54) COMBUSTION CHAMBER FOR FUEL INJECTED ENGINES

(75) Inventor: Chad H. Stovell, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 1182 days.

(21) Appl. No.: 12/577,840

(22) Filed: Oct. 13, 2009

(65) Prior Publication Data

US 2011/0083638 A1    Apr. 14, 2011

(51) Int. Cl.
| F02B 3/00 | (2006.01) |
| F02B 5/00 | (2006.01) |
| F02F 3/28 | (2006.01) |
| F02F 3/24 | (2006.01) |
| F02B 23/06 | (2006.01) |

(52) U.S. Cl.
CPC ............. *F02F 3/28* (2013.01); *F02B 23/063* (2013.01); *F02B 23/0678* (2013.01); *F02F 3/24* (2013.01); *F02B 23/0669* (2013.01); *Y02T 10/125* (2013.01); *F02B 23/0651* (2013.01); *F02B 23/0627* (2013.01); *F02B 23/0696* (2013.01)
USPC .......................................... 123/298; 123/305

(58) Field of Classification Search
USPC .............. 123/193.6, 269, 298, 307, 661, 261, 123/275, 276, 279, 280, 285, 289, 305, 306
See application file for complete search history.

(56) References Cited

U.S. PATENT DOCUMENTS

| 2,269,084 | A | * | 1/1942 | McCarthy | 123/298 |
| 4,617,888 | A | * | 10/1986 | Dent | 123/307 |
| 8,459,229 | B2 | * | 6/2013 | Rothbauer et al. | 123/276 |
| 2007/0044755 | A1 | * | 3/2007 | Lehmann | 123/307 |
| 2011/0253095 | A1 | * | 10/2011 | Rothbauer et al. | 123/276 |

* cited by examiner

*Primary Examiner* — Mahmoud Gimie
*Assistant Examiner* — Sizo Vilakazi
(74) *Attorney, Agent, or Firm* — Navarro Law Office PC; Arthur I. Navarro

(57) ABSTRACT

Passageways are provided within the combustion chamber of a fuel injected internal combustion engine to convey injected fuel to desired positions within the combustion chamber. The fuel-conveying passageways may be either open-sided or closed, and are positioned within the combustion chamber in substantial alignment with a respective spray jet of fuel, enabling optimum distribution of the fuel through the combustion chamber for enhanced mixing with air prior to combustion.

13 Claims, 6 Drawing Sheets

COMBUSTION CHAMBER FOR FUEL INJECTED ENGINES

BACKGROUND OF THE INVENTION

1. Technical Field

This invention relates generally to fuel injected internal combustion engines and more particularly to structures within the combustion chamber of such engines through which fuel injected is transported to respective desired locations within the combustion chamber.

2. Background Art

Widespread concern for protection of the environment has led to increasingly stringent limitations on harmful emissions from internal combustion engines. Carefully timed and precisely metered injection of fuel directly into the combustion chambers of internal combustion engines has proven to be one method of reducing undesirable combustion product emissions. Traditional efforts have been directed to improving the mixing of fuel and air within the combustion chamber prior to combustion. For example, various shapes, such as wedge, hemispherical, elliptical, or toroidal, depressions in the piston crown, and pre-chamber, scroll, and other cylinder structures have been proposed to increase the homogeneity and dispersion of the fuel/air mixtures within the combustion chamber prior to combustion.

Heretofore, fuel/air mixing improvements have been directed to increased mixing and flow control of the mixture. For example, U.S. Pat. No. 2,269,084 granted on Jan. 6, 1942 to J. J. McCarthy for an Internal Combustion Engine describes the use of arcuate ribs and baffles on the piston crown that cooperate to direct intake air drawn into the combustion chamber during the intake stroke into a vortex that is formed into a rapidly whirling air column that achieves its greatest turbulence just before fuel is injected into the combustion chamber. In a similar manner, U.S. Pat. No. 4,617,888 granted Oct. 21, 1986 to John C. Dent for a Piston for Internal Combustion Engines, proposes the use of arcuate ribs extending above the piston crown to provide turbulence in the fuel/air mixture prior to combustion and prevent the combustion flame front from spreading straight across the top of the piston without being deflected by one of the ribs. More recently, U.S. Patent Publication No. US2007/0044755A1 published Mar. 1, 2007 for a Device and Method to Increase Fuel Burn Efficiency in Internal Combustion Engines by Harry V. Lehmann proposes the use of vanes extending outwardly from the top of the piston to induce vortexes in the fuel/air mixture prior to combustion.

Notwithstanding all previous attempts to improve combustion fuel/air mixing, further improvements are needed to achieve lower engine emissions and better fuel economy. None of the aforementioned proposals are directed to better placement and distribution of the injected fuel within the combustion chamber prior to mixing with the intake air charge. The present invention is directed to overcoming the problem of less than ideal distribution of fuel in the combustion chamber prior to mixing with air and subsequent combustion. In accordance with the present invention, improved placement and distribution of fuel within the combustion chamber is achieved by transporting portions of the fuel, after discharge from a fuel injector, to optimally preferred areas of the combustion chamber before being introduced into, and mixed with, intake air.

SUMMARY OF THE INVENTION

In accordance with one aspect of the present invention, a combustion chamber for fuel injected internal combustion engine has at least one flume positioned within the combustion chamber. The word "flume," as used herein, means a structure that provides a channel or conduit for conveying, or transporting, fuel after discharge from a fuel injector to a desired location within the combustion chamber. More specifically, in accordance with the present invention a flume has at least one passageway extending through the flume in substantial alignment with a predefined direction of flow of the injected fuel. At least a portion of the injected fuel is conveyed through the passageway and subsequently conducted to a predetermined portion of the combustion chamber.

Other features of the combustion chamber embodying the present invention include a nozzle of the fuel injector having a plurality of ports through which the fuel is injected into the combustion chamber in separately directed spray jets, and the combustion chamber having a plurality of flumes each of which is aligned with a respective one of the spray jets.

Still another feature of the combustion chamber embodying the present invention includes the fuel injector being centrally located within the combustion chamber, with each of the spray jets of fuel discharged from the injector nozzle being directed in a respective separate radial direction from the nozzle, and the plurality of flumes are disposed circumferentially around the combustion chamber in radially spaced relationship from the nozzle.

Yet another feature of the combustion chamber embodying the present invention includes the flumes being disposed on the crown of the piston.

In yet another embodiment of the combustion chamber embodying the present invention, the flumes are positioned on the cylinder head.

BRIEF DESCRIPTION OF THE DRAWINGS

A more complete understanding of the combustion chamber or fuel injected internal combustion engine can be had by reference to the following detailed description when taken in conjunction with the accompanying drawings, wherein.

DETAILED DESCRIPTION OF THE INVENTION

Figure 1:
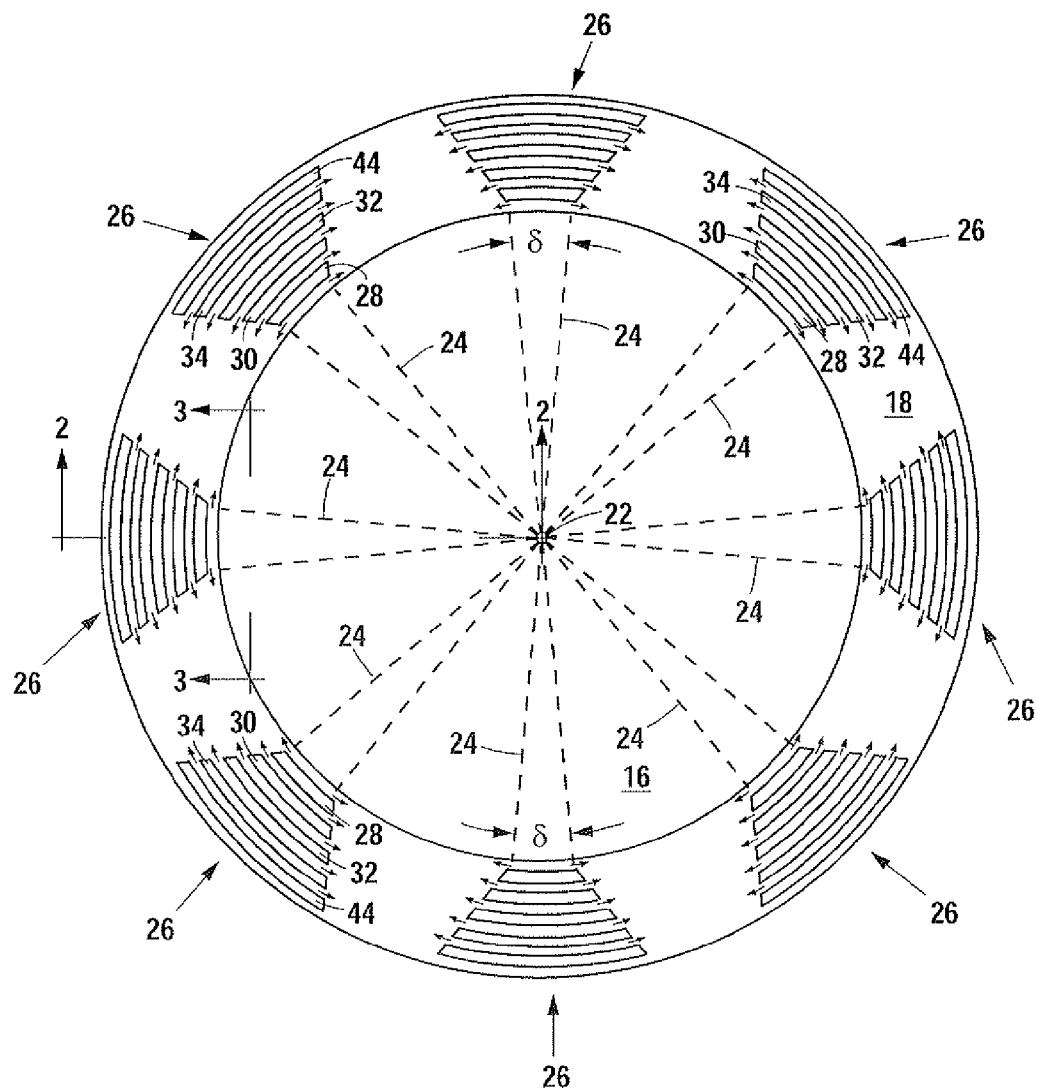
FIG. 1 is a plan view of a piston embodying the present invention, having a plurality of fuel-directing flumes circumferentially arranged around the periphery of the piston.
Figure 2:
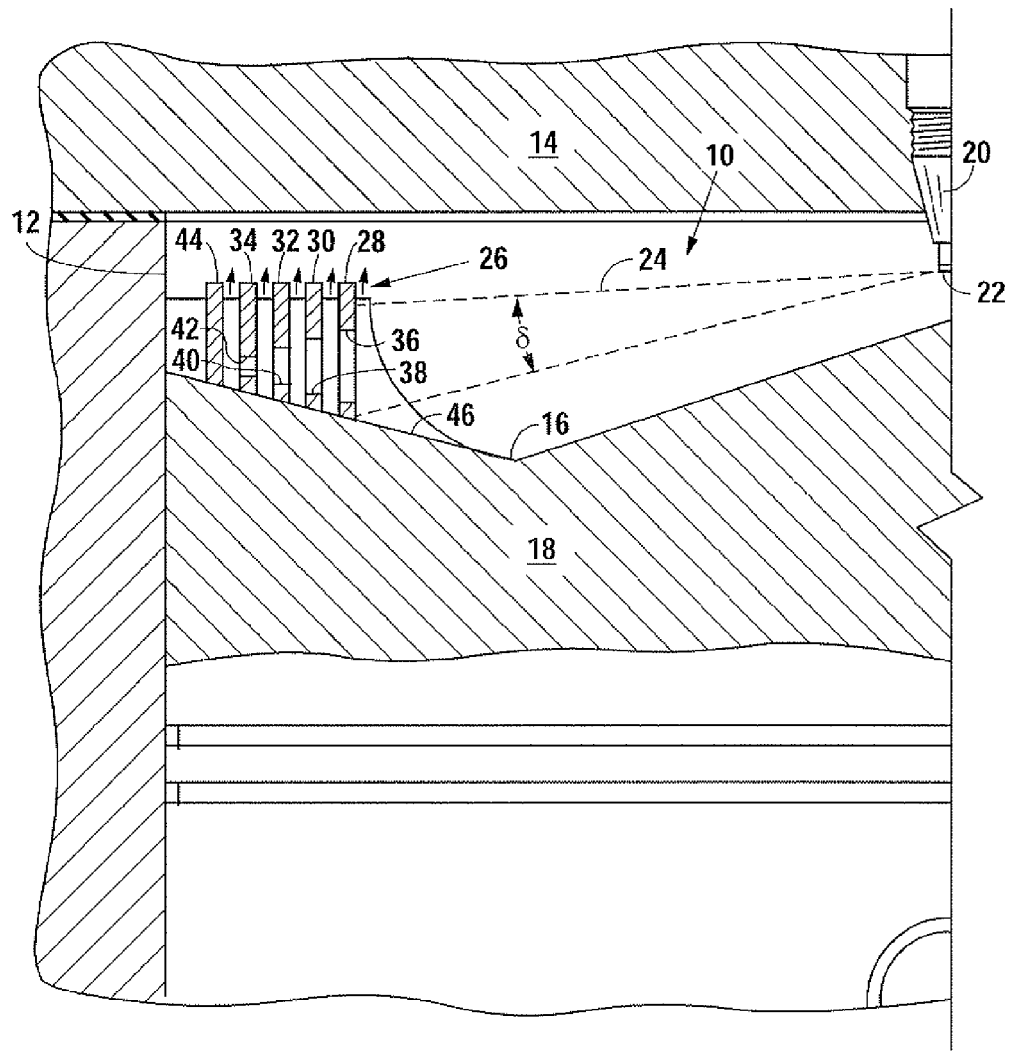
FIG. 2. is a cross-sectional view of the piston and associated combustion chamber embodying the present invention, taken along the line of 2-2 of FIG. 1.
Figure 3:
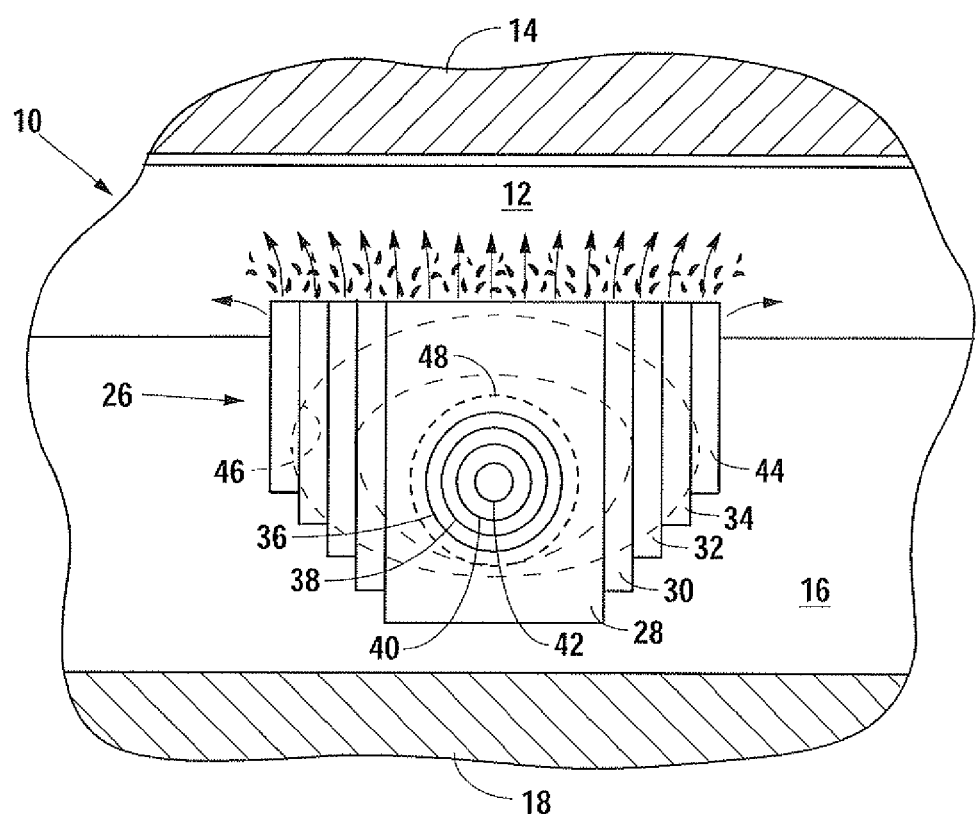
FIG. 3 is a cross-sectional view of the piston and associated combustion chamber embodying the present invention, taken along the line 3-3 of FIG. 1.

A preferred embodiment of a combustion chamber, generally indicated by the reference numeral 10, for a fuel injected internal combustion engine is illustrated in FIGS. 1-3. The combustion chamber 10 is defined by a cylindrical circumferential wall, or bore, 12, a cylinder head 14, and the crown 16 of a piston 18. The piston 18 is reciprocatably moveable, i.e., capable of alternating up and down or back and forth movement, within the bore 12. The combustion chamber also has one or more intake and exhaust valves, not shown for the sake of better illustrating the salient features of the present invention.

In this embodiment of the present invention, a fuel injector 20 is mounted in the cylinder head 14 and has a nozzle 22 extending into the combustion chamber 10. The nozzle 22 is centrally located within the combustion chamber 10 and has a plurality of holes, or ports, through which fuel is injected into the combustion chamber in separately directed spray jets 24. As illustrated in this embodiment, the nozzle 22 has 8 ports through which fuel is injected into the combustion chamber in 8 discrete conically-shaped spray jets 24, each having a predefined included angle δ, in separate predefined radial directions. Accordingly, the combustion chamber 10 has a plurality of flumes, each generally indicated by the reference numeral 26, circumferentially spaced around the periphery of the combustion chamber. Each of the flumes 26 is in alignment with a respective one of the spray jets 24.

In this embodiment, each of the flumes 26 is a structure comprising of plurality of radially spaced apart barrier walls 28, 30, 32, 34, each having a respective passageway 36, 38, 40, 42 in coaxial alignment with a respective one of the spray jets 24. The passageways 36, 38, 40, 42 have progressively decreasing cross-sectional areas so that the spray jet 24 is divided into roughly equal proportions as it passes through the flume structure 26 and the momentum of the fuel is desirably maintained throughout passage through the flume. The fifth barrier wall 44 is positioned at the radially outer end of the flume 26 and provides a solid barrier prohibiting further radial conveyance of the fuel contained in the spray jet 24. The barrier walls 28, 30, 32, 34 of each flume 26 are disposed in respective recesses 46 provided in the periphery of the crown 16 of the piston 18.

In operation, each of the separately defined conically expanding fuel spray jets 24 discharged from the nozzle 32 of the fuel injector 20 impinge on a respectively aligned one of the flumes 26. The outer boundary of the circular cross-sectional area of the fuel spray jet 24 impinging on the first barrier wall 28 of the flume 26 is indicated by dash lines 48 in FIG. 3.

The flume structure 26 separates a fuel spray jet 24 into substantially equal portions and directs the separated portions upwardly and circumferentially into the peripheral area of the combustion chamber 10. For example, as illustrated in this first embodiment, the flume 26 has 5 barrier walls 28, 30, 32, 34 and 44 with coaxially aligned passageways 36, 38, 40 and 42 respectively provided through the first 4 barrier walls through which portions of the spray jet 24 are conveyed. In the course of passing through the aligned passageways 36, 38, 40 and 42 the fuel spray jet 24 is divided into five substantially equal portions each comprising about twenty percent of the total fuel discharged in the discrete spray jet 24. Thus, the passageway 36 through the first barrier wall 28 has a cross-sectional area that allows about four-fifths, or eighty percent, of the fuel directed to the first barrier wall to pass through to the second barrier wall 30. The remaining one-fifth, or twenty percent, of the spray jet 24 not passing through the passageway 36 in the first barrier wall 28 is deflected upwardly and laterally outwardly into the combustion chamber 10. Similarly, three-fourths, or seventy-five percent, of the fuel that passes the first barrier wall 28 is passed through the passageway 38 in the second barrier wall 30. The one-fourth, or twenty-five percent, presenting twenty percent of the total initial fuel contained in the spray jet 24, not passed through the passageway 38 is deflected upwardly and circumferentially outwardly through the channel formed between the first barrier wall 28 and the second barrier wall 30 and into the periphery of the combustion chamber 10 whereat it is then advantageously mixed with intake air prior to combustion.

In a similar manner, two-thirds, or about sixty-seven percent, of the fuel spray jet 24 that passes through the second barrier wall 30 is passed through the passageway 40 in the third barrier wall 32. The remaining one-third, or about thirty-three percent, again comprising twenty percent of the initial fuel jet spray 24, not passed through the passageway 40 is deflected upwardly and circumferentially outwardly into the periphery of the combustion chamber 10 and subsequently mixed with air prior to combustion.

Continuing in the same manner, one-half, or fifty percent, of the fuel conducted through the passageway 40 in the third barrier wall 32 is passed through the passageway 42 in the fourth barrier wall 34. The remaining one-half, or fifty percent, again comprising twenty percent of the initial fuel jet spray 26 is deflected through the channel formed between the third and fourth barrier walls 32 and 34 and thence upwardly and circumferentially outwardly into the periphery of the combustion chamber 10.

The fuel passing through the passage way 42 represents the remaining twenty percent of the initial fuel carried in the spray jet 24. The remaining twenty percent portion of the fuel spray jet 24 impinges on the fifth barrier wall 44 and is deflected through the channel formed between the fourth barrier wall 34 and the fifth barrier wall and is directed upwardly and circumferentially outwardly into the periphery of the combustion chamber 10 and mixed with intake air prior to combustion.

The above-described preferred embodiment of the present invention is presented for illustrative purposes. For example, each of the flume structures may consist of more or fewer than five barrier walls and the passageways through the barrier walls may not all be sized to equally divide the spray jet. Also, the passageways may have a differently shaped cross section, such as rectangular, instead of the circular shapes shown. Furthermore, the flume may be positioned at other positions within the combustion chamber and have a different structure, such as the flume described in the following embodiments.

Figure 4:
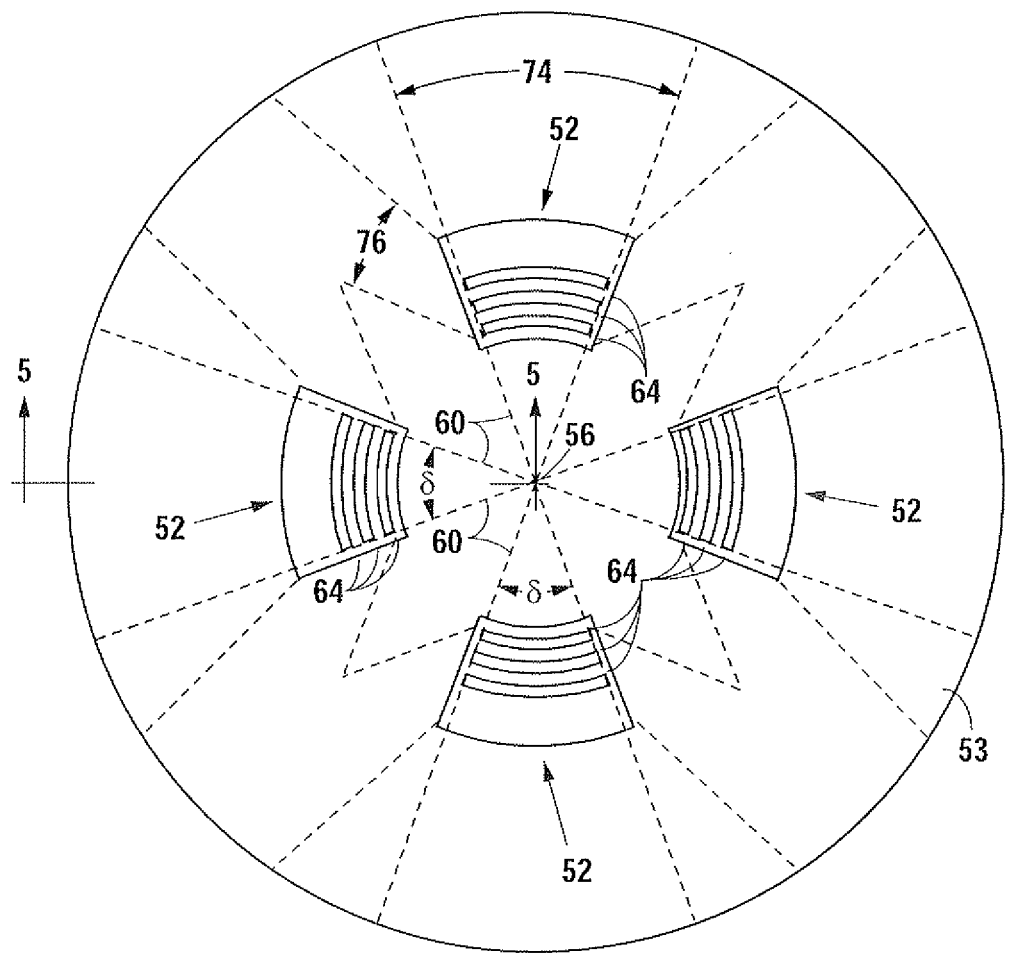
FIG. 4 is a plan view of a piston having a plurality of fuel-directing fumes circumferentially arranged in the combustion chamber in close proximity to the fuel injector, in accordance with the present invention.
Figure 5:
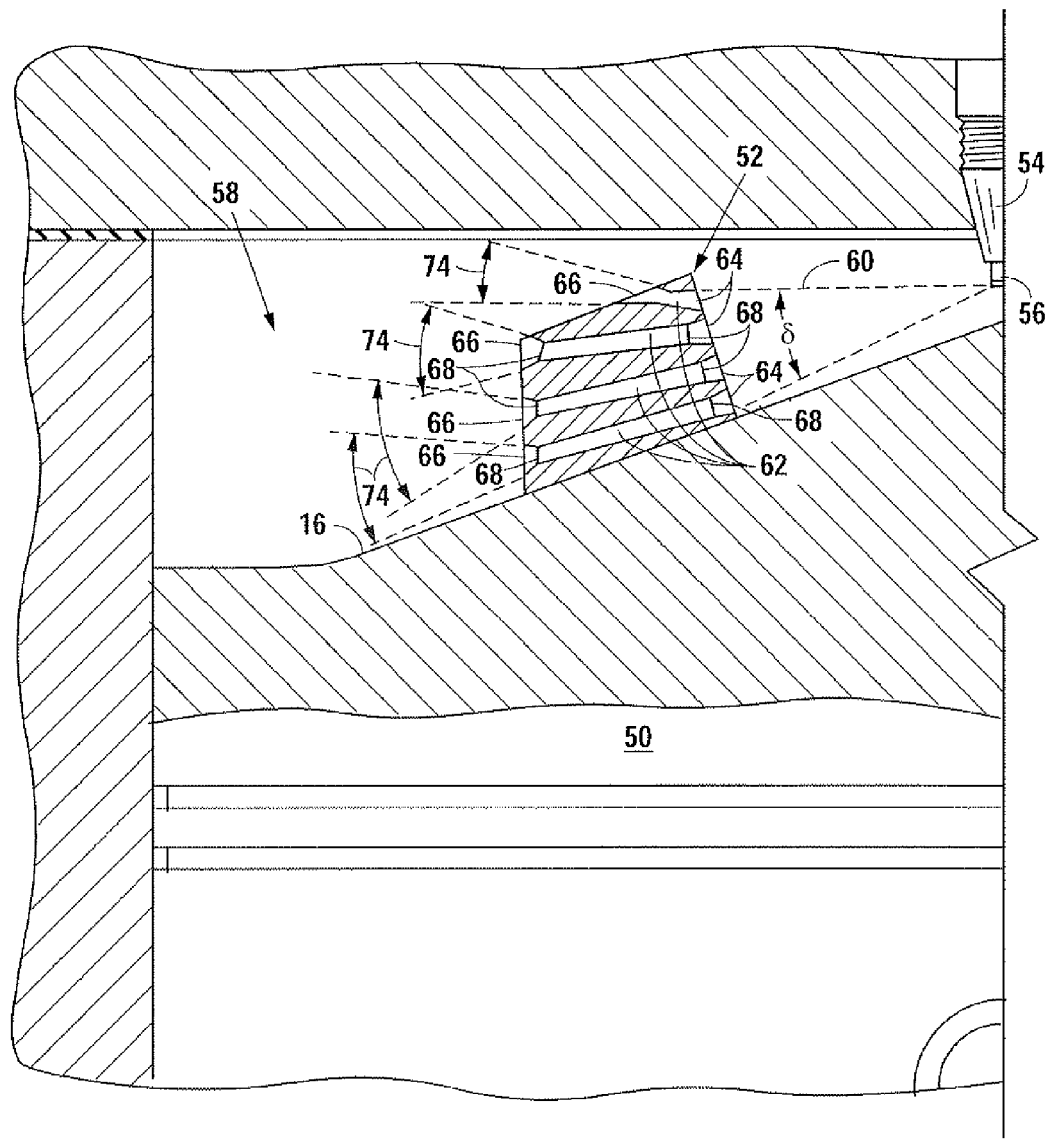
FIG. 5 is a cross-sectional view of the piston and associated combustion chamber embodying the present invention, taken along the line 5-5 of FIG. 4.

In a first alternative embodiment, a flume structure 52 is illustrated in FIGS. 4 and 5. In this example, the flume 52 is positioned on the crown 16 of a piston 50 in close radial proximity to a fuel injector 54 having a four-hole nozzle 56 through which fuel is injected into the combustion chamber, generally indicated by the reference numeral 58. Through this arrangement, fuel is injected into the combustion chamber 58 in four conically-shaped discrete spray jets 60. Each directed in a separate, predefined radial direction and having a pre-defined included angle δ.

In this first alternative embodiment, the flumes 52 are unitary structures having a plurality of slots, or rectangular passageways, 62 extending through each structure. Each of the passageways 62 have an entrance port 64, a rear exist port 66 and two side exit ports 68. Each of the flumes 52 are aligned with a respective fuel spray jet 60. The passageways 62 are positioned to be in substantial alignment with a respective one of the fuel spray jets 60 when the piston is at a desired predetermined position, e.g., within about ten degrees TDC, so that at least a portion of the fuel in the spray jet is transported through the passageway 62 and subsequently conducted to a predetermined position within the combustion chamber 58.

More specifically, the passageways 62 are preferably tapered front to back as best shown in FIG. 5, i.e., the entrance ports 64 of the passageways 62 have a larger cross-sectional area than that of the rear exit ports 66. It is desirable that the collective total cross-sectional areal of the rear and side exit ports 66 and 68 not be less than the cross-sectional area of an associated entrance port so that fuel momentum is maintained during flow through the flume 52. Desirably, the rear and side exit ports 66 and 68 have a small chamfer at the respective port opening to increase the dispersion angle the fuel exiting the ports.

Figure 6:
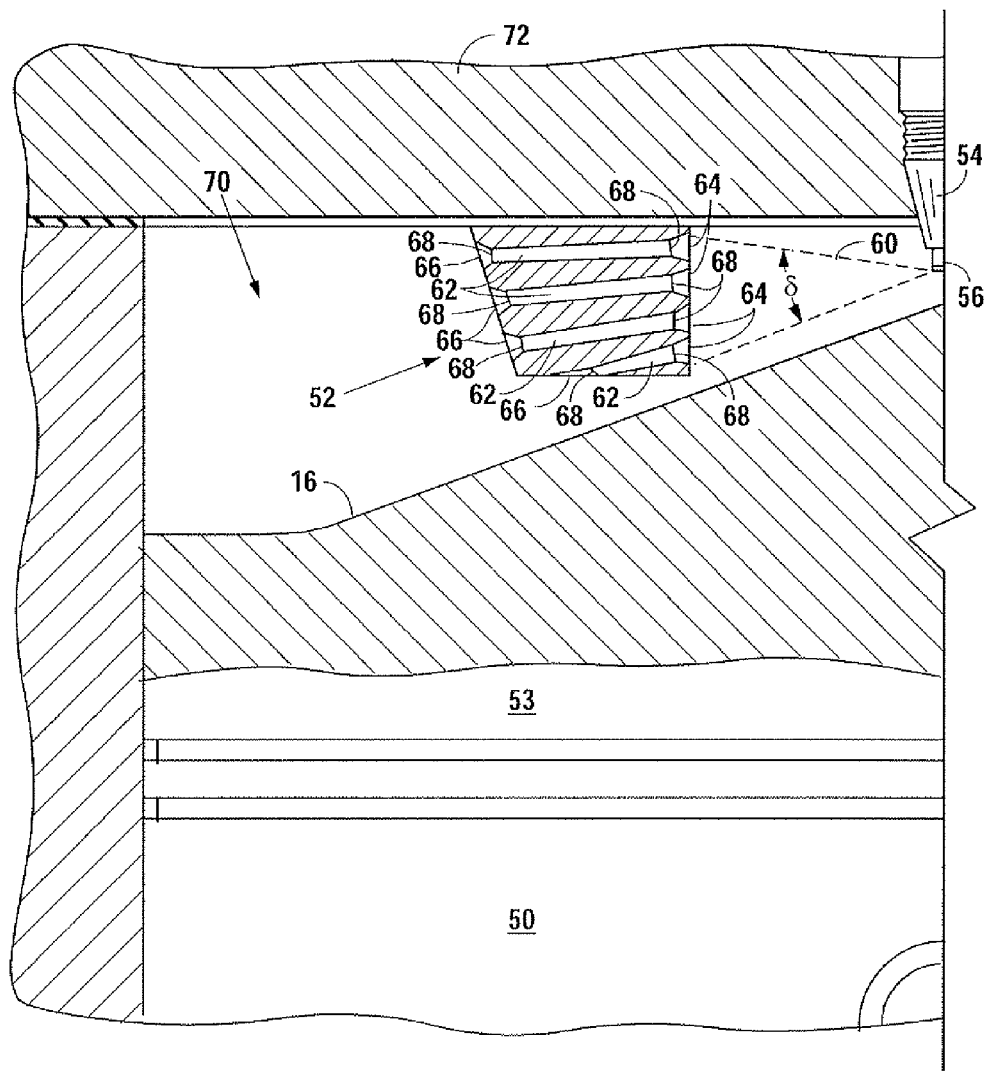
FIG. 6 is a cross-sectional view of another embodiment of the present invention in which the fuel-directing flumes are positioned on a cylinder head surface in the combustion chamber.

In a second alternate embodiment illustrated in FIG. 6, a combustion chamber 70 has the flume 52, described in the previous embodiment, mounted on the cylinder head 72. This arrangement, enables fuel to be injected into the combustion chamber over a wider range of piston positions and injection timing, because the position of the piston 74 is not as critical as it is in the earlier described embodiments.

It should be understood that the flumes may have different structures and locations than those shown, the principal requirement being that the flume convey fuel injected into the combustion chamber to a desired position within the chamber for optimal mixing with air prior to combustion. To that end, the flume must provide passageways through which fuel is conveyed to the desired location within the combustion chamber.

The above-described flume designs are intended to maximize the interaction between the piston bowl/combustion chamber configuration and the diesel fuel/gaseous fuel jets to achieve low emissions and particulate matter formation. Passageways provided within each of the flume structures convey fuel to desired portions of the combustion chamber to enhance the mixing of fuel and air. The passageway take advantage of the fuel jets high momentum by separating and redirecting discrete fuel jet into preferred portions of the combustion chamber so that better fuel and air mixing can be achieved. A series of channels may be stacked in the radial direction, as described in the preferred illustrative embodiment, to provide maximum dispersion on top of the piston squish/quench zone. Alternatively, similar channels may be oriented to improve dispersion in the circumferential and radial direction as well. The first and second alternative embodiments of the present invention, describe a flume structure that provides an impingement target containing channels through which separated portions of a fuel spray jet are conveyed to desired locations within the combustion chamber. To that end, the impingement targets and associated passageways may be positioned on either the piston or the cylinder head, depending on a preferred application.

Thus, although the present invention is described in terms of preferred exemplary embodiments, those skilled in the art will recognize that the construction and position of the flumes may be modified as discussed above. Such arraignments of flumes embodying the present invention are intended to fall within the scope of the following claims.

Other aspect, features, and advantages of the present invention may be obtained from a study of this disclosure and the drawings, along with the appended claims.

What I claim is:

1. A combustion chamber for a fuel injected internal combustion engine, said combustion chamber being at least one at least partially defined by a cylindrical circumferential wall, a cylinder head, and the crown of a piston reciprocatably movable within said combustion chamber, and having disposed therein a fuel injector with a nozzle through which fuel is injected in a predefined direction into said combustion chamber, said combustion chamber further comprising:
    at least one flume disposed within said combustion chamber, said flume having at least one passageway extending through the flume in substantial alignment with said predefined direction of the injected fuel, at least a portion of said injected fuel being conveyed through said passageway and subsequently conducted to a predetermined portion of the combustion chamber; wherein the nozzle of said fuel injector has a plurality of ports through which the fuel is injected into said combustion chamber in separately directed spray jets, and said combustion chamber comprises a plurality of flumes each of which is aligned with a respective one of said spray jets.

2. The combustion chamber, as set forth in claim 1, wherein said fuel injector is centrally located within said combustion chamber and each of said spray jets is directed in .a respective separate radial direction from the nozzle of said fuel injector, and said plurality of flumes are disposed circumferentially around said combustion chamber and radially spaced from said nozzle.

3. A combustion chamber for a fuel injected internal combustion engine, said combustion chamber being at least one at least partially defined by a cylindrical circumferential wall, a cylinder head, and the crown of a piston reciprocatably movable within said combustion chamber, and having disposed therein a fuel injector with a nozzle through which fuel is injected into said combustion chamber in separately directed spray jets, said combustion chamber comprising:
    a plurality of flumes disposed therein, each of said flumes having at least one passageway extending through the flume in substantial alignment with a respective one of said spray jets whereby at least a portion of said spray jet is conveyed through said passageway and subsequently conducted to a predetermined portion of said combustion chamber.

4. The combustion chamber, as set forth in claim 3, wherein said fuel injector is centrally located within said combustion chamber and each of said spray jets is directed in a respective separate radial direction from the nozzle of said fuel injector, and said plurality of flumes are disposed circumferentially around said combustion chamber and radially spaced from said nozzle.

5. The combustion chamber, as set forth in claim 3, wherein said plurality of flumes is disposed on the crown of said piston.

6. The combustion chamber, as set forth in claim 3, wherein the passageway extending through said flumes has a circular cross section.

7. The combustion chamber, as set forth in claim 3, wherein the passageway extending through said flumes has a substantially rectangular cross section.

8. A combustion chamber for a fuel injected internal combustion engine, said combustion chamber being at least one at least partially defined by a cylindrical circumferential wall, a cylinder head, and the crown of a piston reciprocatably movable within said combustion chamber, and having disposed therein a fuel injector with a nozzle through which fuel is injected in a predefined direction into said combustion chamber, said combustion chamber further comprising:
    at least one flume disposed therein, said flume having at least one passageway extending through the flume, said passageway being in substantial alignment with said predefined direction of the injected fuel when said piston is at a predetermined position in said combustion chamber and at least a portion of said injected fuel is conveyed through said passageway and subsequently conducted to a predetermined portion of said combustion chamber; wherein said fuel is injected into said combustion chamber in a plurality of discrete conically-shaped spray jets each having a predefined included angle and said passageway extending through the flume is positioned within said included angle of the spray jet when said fuel is injected into the combustion chamber.

9. The combustion chamber, as set forth in claim 8, wherein the nozzle of said fuel injector has a plurality of ports through which the fuel is injected into said combustion chamber in separately directed spray jets, and said combustion chamber comprises a plurality of flumes each of which is aligned with a respective one of said spray jets.

10. The combustion chamber, as set forth in claim 9, wherein said fuel injector is centrally located within said combustion chamber and each of said spray jets is directed in a respective separate radial direction from the nozzle of said fuel injector, and said plurality of flumes are disposed circumferentially around said combustion chamber and radially spaced from said nozzle.

11. The combustion chamber, as set forth in claim 7, wherein said flume is disposed on the crown of said piston.

12. The combustion chamber, as set forth in claim 7, wherein the passageway extending through said flume has a circular cross section.

13. The combustion chamber, as set forth in claim 7, wherein the passageway extending through said flume has a substantially rectangular cross section.

\* \* \* \* \*